Patented May 11, 1926.

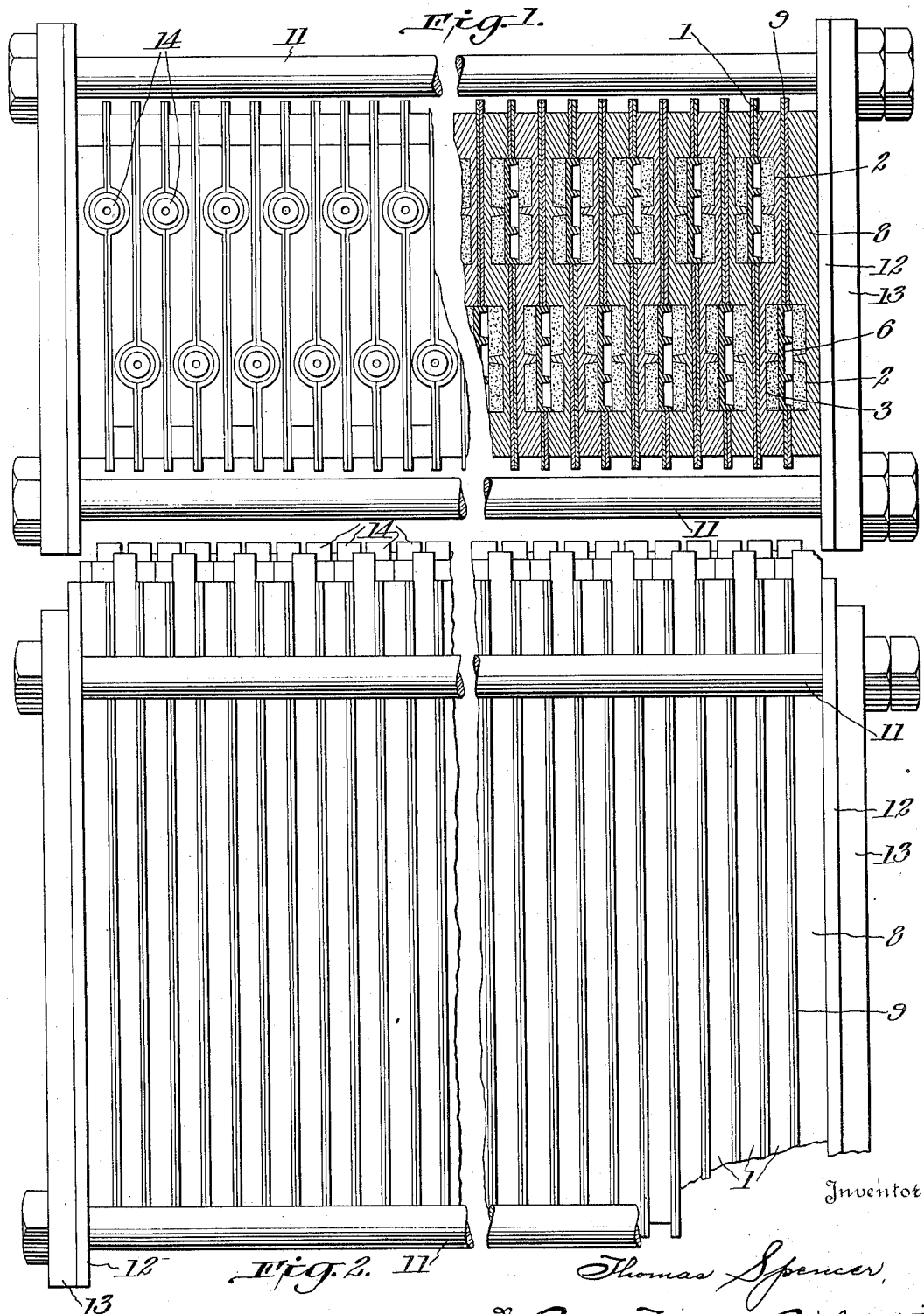

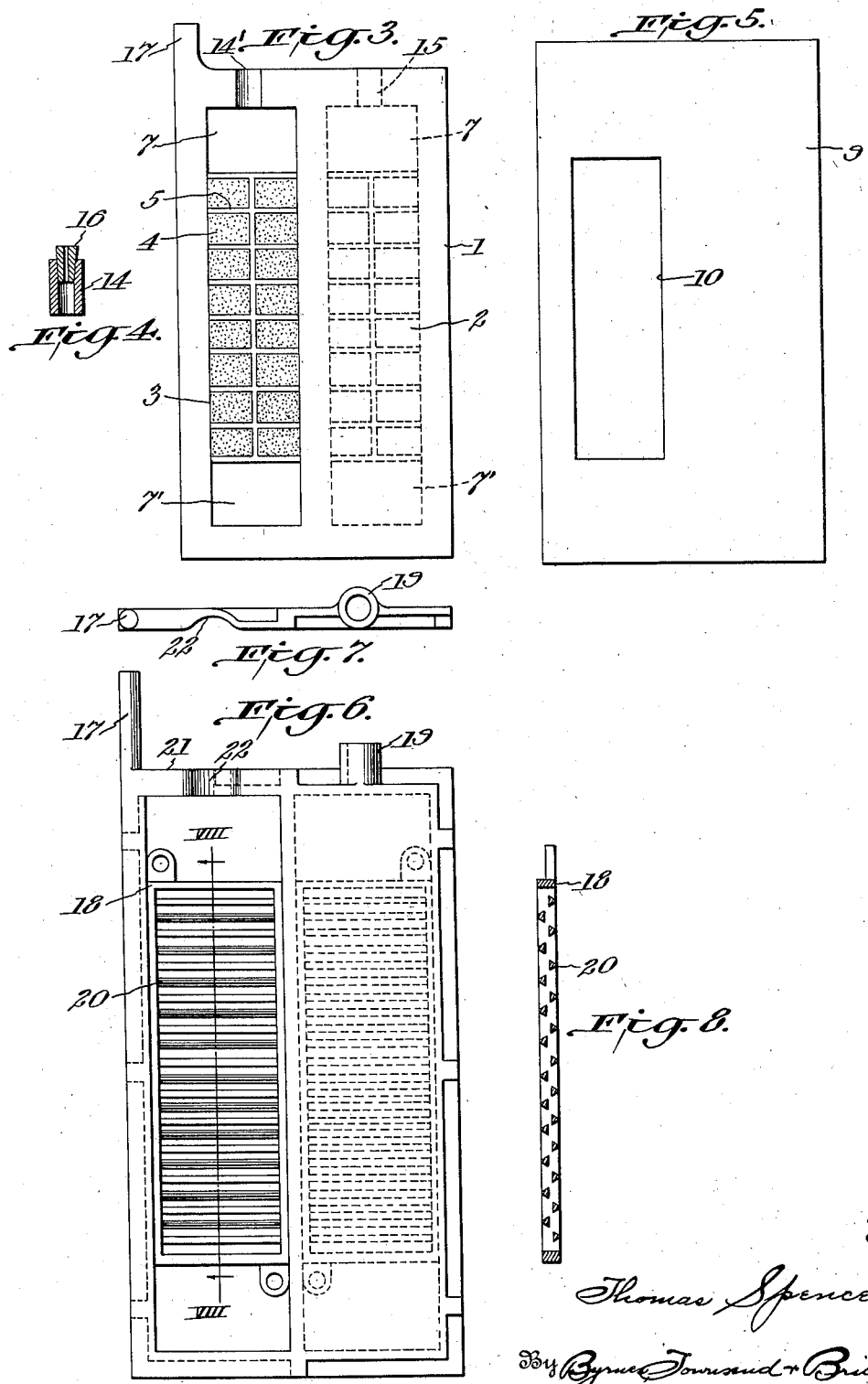

1,584,248

UNITED STATES PATENT OFFICE.

THOMAS SPENCER, OF INDIANAPOLIS, INDIANA, ASSIGNOR TO THE PREST-O-LITE COMPANY, INC., A CORPORATION OF NEW YORK.

STORAGE BATTERY AND ELECTRODE THEREFOR.

Application filed June 11, 1924 Serial No. 719,404.

This invention relates to improvements in storage batteries of the type in which active materials of positive and negative polarity are carried in conductive relation on the same support. Electrodes so formed are ordinarily described as duplex or bi-functional. The invention comprises a novel form of such electrodes and a compact, high voltage battery assembly characterized by substantial freedom from short circuiting and buckling.

At an early stage in the storage battery art it was proposed to simplify construction by utilizing as cell walls the conductive plates supporting the active material. Strips of rubber were placed between the margins of adjacent plates and the assembly was held under compression by bolts. In this way receptacles for electrolyte were provided between each pair of plates.

In prior constructions of this type, it has been the practice to place or form the positive active material on one side of the plate and the negative active material on the other side directly opposite the positive. Since a primary object is to produce a compact, light weight battery the plates are ordinarily thin and are likely to become perforated. If this happens the cell is short circuited because of the juxtaposition of the active materials of opposite polarity. The battery may be seriously injured or ruined by this action.

In accordance with the present invention, this difficulty is avoided by a non-alined or staggered arrangement of the active materials upon the supports. Each plate carries a body of positive active material on one side and a body of negative active material on the other. These bodies do not occupy opposite plate areas; current passes across the plate, not directly through it as heretofore. Various positive advantages are also obtained by the new construction, as will appear from the subsequent description.

Reference is to be made to the accompanying drawing in which—

Fig. 1 is a partial plan view, partly in section, showing one form of the improved battery;

Fig. 2 is a side elevation of the battery of Fig. 1;

Fig. 3 shows a plate, the active material receptacle on the reverse side being shown in dotted outline;

Fig. 4 is a vertical section through one form of vent plug;

Fig. 5 is an elevation of the insulating sheet separating the plates;

Fig. 6 is a view similar to Fig. 3 showing a modified form of plate;

Fig. 7 is a top plan view of the plate shown in Fig. 6; and

Fig. 8 is a vertical section through the grid of Fig. 6 and is taken on line VIII—VIII of that figure.

In Figs. 1 to 5 of the drawings, reference numeral 1 denotes a conductive plate, preferably an integral lead-antimony casting. The plate has cavities 2 and 3, one on each side, adapted to receive active material 4. The cavities are best made oblong and arranged as shown, but the essential condition is that they shall not be opposite each other. A suitable supporting structure, such as ribs 5, may be provided in the cavities.

The surface of the active material should be somewhat below that of the plate, as space is to be left for a separator 6 between opposed bodies of active material. Ribbed wooden separators are preferred but others may be used if desired. Openings 7, 7' at the top and bottom respectively of the active material provide ample room for electrolyte.

In the assembly of the battery, a terminal plate 8, which may have only one cavity 2 for active material, is covered with two sheets 9 of flexible insulating material. This material is preferably soft rubber. One sheet might serve, but two are desirable to insure a good seal about the vent tube, as subsequently described. Each sheet 9 has an opening 10 (Fig. 5) which coincides with the area occupied by the active material and permits access of electrolyte to it. A separator 6 is placed in contact with the active material. Another plate is placed on the sheets 9 with a cavity containing active material opposite to cavity 2. The materials in these two cavities are of opposite polarity. Additional plates, separators and insulating sheets are assembled in the manner indicated until the desired number is reached.

Any active material which may be dislodged will fall into openings 7'. Sheets 9 provide a wall between these openings in adjacent plates, so that the active materials of opposite polarity are kept separate.

The assembly is desirably held together by bolts 11 passing through pressure plates at each end of the series of cells. Nuts on the bolts are screwed up to force the plates and rubber sheets together, thus securing tight joints between them. The pressure plates may comprise a hard rubber or other insulating sheet 12 and a lead-coated steel plate 13. The present invention is not limited to this particular holding means, however, and any suitable mechanical device for this purpose may be adopted.

A filling and vent tube 14 is inserted between each pair of sheets 9. The electrode plates are grooved as indicated at 14' and 15, Fig. 3, to receive the tube. Portions of the margins of sheets 9 are forced into the grooves and provide a seal between the tube and plates. A perforated plug 16 is provided for each tube.

The battery may be used in the form shown, but I prefer to place it in a casing and embed it in a suitable thermoplastic material. The lugs 17 on the plates and the vents will of course remain exposed.

In the embodiment of the invention illustrated in Figs. 6 to 8, the construction is in general similar to that previously described, the principal differences being the provision of a separate support 18 for the active material and an integral vent 19.

The support 18 comprises a grid structure having bars 20, preferably of small size. Active material is placed on the support and formed in the usual way, or preformed active material may be used. The support is secured to the plate 21 in any suitable way. This may be conveniently done by burning the support to the plate at one or more points. This form of plate and grid presents some manufacturing advantages over that of Fig. 3 and is also lighter.

A further simplification is effected by molding the vent 19 integral with plate 21. The plate 21 is depressed marginally at 22 to receive the vent of the adjacent plate when the battery is assembled. Only one sheet 9 of rubber is required to secure a good seal at the vent. As noted above, two are generally desirable in the form of the invention first described.

The present construction provides a battery which will give an exceptionally high voltage for its weight and volume. The staggered arrangement of the positive and negative active materials carried by each plate makes it unnecessary to provide a relatively thick plate. This is required when the active materials are placed in alinement with each other on opposite sides of the plate, for otherwise defects in the plate may develop and cause short circuiting. The present distribution of the active materials also substantially prevents buckling of the plates. The improved battery is especially desirable for radio use, for example intead of dry cells in the plate circuit of vacuum tubes.

As high a voltage as desired may be obtained readily and economically with storage batteries as described herein. Any desired intermediate voltage may be secured by making connection to the proper lugs on the plates. The battery may be charged in the usual manner.

The invention is not limited to the particular construction shown, except with respect to the non-alined arrangement of the active materials. The terms electrode, separator, insulating means, and the like, as used in the appended claims, are therefore to be interpreted broadly.

I claim:

1. A storage battery electrode having a body of positive active material on one side and a body of negative active material on the other, said bodies occupying non-alined electrode areas, whereby short circuiting of the bodies in case of deterioration of the electrode is prevented.

2. A bi-polar storage battery electrode having a cavity for active material occupying a substantial portion of one-half of one side, and another cavity for active material occupying a substantial portion of the opposite half of the other side, said cavities being in electrical connection across the electrode area joining the two cavities, whereby short circuiting of the active material in the respective cavities in case of deterioration of the electrode is prevented.

3. A storage battery comprising electrodes each having non-alined cavities on opposite sides and containing active material, insulating material between the electrodes adapted to form a liquid-tight joint on compression, and means for compressing the electrodes and insulating material.

4. A bi-polar storage battery electrode comprising a plate, supports carrying active material of opposite polarity secured one on each side of said plate, said supports occupying nonalined electrode areas and being in conductive relation to each other.

5. In a storage battery of the bolted assembly type in which the electrode plates form the cell walls, the improvement which comprises the non-alinement of the positive and negative active materials carried by each electrode.

6. A storage battery comprising electrodes each having non-alined cavities on opposite sides and containing respectively active materials of positive and negative polarity, a separator between opposed bodies of active material on adjacent electrodes, a sheet of soft rubber lying between adjacent plates and having an opening coinciding with the area occupied by the active material, and means for compressing the assembly to form a liquid-tight joint between the electrodes and rubber sheets.

7. A storage battery comprising two rows of cells having electrodes carrying active materials on opposite sides, and conductive means for transmitting current from each cell of one row to the next succeeding cell of the other, whereby series connection is established without juxtaposition of positive and negative active materials on the same electrode.

8. A storage battery comprising a series of conductive electrodes each having positive and negative active material respectively on opposite sides and non-alined areas thereof, separators interposed between opposed bodies of active material on adjacent plates, a sheet of insulating material lying between adjacent plates and having an opening coinciding with the area occupied by the active material, vent means, and means for compressing the assembly to form a liquid-tight joint between the electrodes and sheets.

In testimony whereof, I affix my signature.

THOMAS SPENCER.